United States Patent
Gorrepati

(10) Patent No.: US 10,860,638 B2
(45) Date of Patent: Dec. 8, 2020

(54) SYSTEM AND METHOD FOR INTERACTIVE SEARCHING OF TRANSCRIPTS AND ASSOCIATED AUDIO/VISUAL/TEXTUAL/OTHER DATA FILES

(71) Applicant: Uday Gorrepati, Mariemont, OH (US)

(72) Inventor: Uday Gorrepati, Mariemont, OH (US)

( * ) Notice: Subject to any disclaimer, the term of this patent is extended or adjusted under 35 U.S.C. 154(b) by 278 days.

(21) Appl. No.: 15/482,501

(22) Filed: Apr. 7, 2017

(65) Prior Publication Data

US 2017/0293618 A1    Oct. 12, 2017

Related U.S. Application Data

(60) Provisional application No. 62/319,401, filed on Apr. 7, 2016.

(51) Int. Cl.

| | |
|---|---|
| *G06F 7/00* | (2006.01) |
| *G06F 16/48* | (2019.01) |
| *G06F 16/31* | (2019.01) |
| *G06F 16/35* | (2019.01) |
| *G06F 16/738* | (2019.01) |
| *G06F 16/955* | (2019.01) |
| *G06F 16/583* | (2019.01) |
| *G06F 16/783* | (2019.01) |
| *G06F 16/2457* | (2019.01) |
| *G06F 40/151* | (2020.01) |
| *G06F 40/169* | (2020.01) |
| *G06F 16/40* | (2019.01) |

(52) U.S. Cl.
CPC ........ *G06F 16/48* (2019.01); *G06F 16/24578* (2019.01); *G06F 16/316* (2019.01); *G06F 16/358* (2019.01); *G06F 16/5846* (2019.01); *G06F 16/738* (2019.01); *G06F 16/7844* (2019.01); *G06F 16/955* (2019.01); *G06F 40/151* (2020.01); *G06F 40/169* (2020.01); *G06F 16/40* (2019.01)

(58) Field of Classification Search
CPC ........ G06F 16/41; G06F 16/951; G06F 16/93; G06F 16/9537; G06F 16/958
See application file for complete search history.

(56) References Cited

U.S. PATENT DOCUMENTS

| | | | | |
|---|---|---|---|---|
| 5,903,892 | A * | 5/1999 | Hoffert | G10H 1/0058 |
| 6,374,260 | B1 * | 4/2002 | Hoffert | G10H 1/0058 |
| 6,990,448 | B2 * | 1/2006 | Charlesworth | G10L 15/187 |
| | | | | 704/243 |

(Continued)

*Primary Examiner* — Daniel A Kuddus
(74) *Attorney, Agent, or Firm* — Quarles & Brady LLP

(57) ABSTRACT

A system and method for processing digital multimedia files to provide searchable results includes the steps of converting a digital multimedia file to a plain text data format, annotating each word in the file with an indicator such as a time stamp to indicate where the word appears in the file, converting each indicator to an encoded indicator using characters that are not indexed by search software, indexing the converted, annotated file, storing the converted, annotated file and a file location of the converted, annotated file, receiving a query from a user's computer, and returning search results to the user's computer that include search snippets comprising unindexed portions of one or more files considered responsive to the query and the file location of those files.

14 Claims, 7 Drawing Sheets

(56) References Cited

U.S. PATENT DOCUMENTS

| | | | |
|---|---|---|---|
| 7,257,533 B2* | 8/2007 | Charlesworth | G06F 16/7844 704/249 |
| 7,725,733 B2* | 5/2010 | Higashiura | G06F 21/32 713/186 |
| 8,977,953 B1* | 3/2015 | Pierre | G06F 16/38 715/230 |
| 2004/0024778 A1* | 2/2004 | Cheo | G06F 16/2237 |
| 2006/0015339 A1* | 1/2006 | Charlesworth | G10L 15/187 704/251 |
| 2010/0183246 A1* | 7/2010 | King | G06F 16/435 382/305 |
| 2010/0251291 A1* | 9/2010 | Pino, Jr. | H04N 21/4828 725/34 |
| 2013/0243324 A1* | 9/2013 | King | G06F 16/93 382/176 |
| 2013/0308922 A1* | 11/2013 | Sano | H04N 21/47217 386/245 |
| 2014/0289226 A1* | 9/2014 | English | G06F 16/685 707/722 |
| 2014/0289336 A1* | 9/2014 | Ho | G06Q 10/10 709/204 |
| 2017/0364746 A1* | 12/2017 | King | G06K 9/00979 |

* cited by examiner

SYSTEM AND METHOD FOR INTERACTIVE SEARCHING OF TRANSCRIPTS AND ASSOCIATED AUDIO/VISUAL/TEXTUAL/OTHER DATA FILES

CROSS REFERENCE TO RELATED APPLICATIONS

This application claims the benefit of priority to U.S. provisional application 62/319,041, filed Apr. 7, 2016.

REFERENCE REGARDING FEDERALLY SPONSORED RESEARCH OR DEVELOPMENT

Not applicable

SEQUENCE LISTING

Not applicable

BACKGROUND

1. Field of the Invention

The present invention relates generally to presentation techniques for providing searching and retrieval of text associated with one or more audio or video data files.

2. Background

Existing search engines are useful tools for trying to find digital content connected with a search query in some form, e.g., via exact or approximate matches between the search query and the content or metadata associated with the content. Traditional search engines provide a graphical user interface that receives a user query, analyze that query against a repository of information using one or more algorithms, and then serve results back to the user for further viewing and analysis by the user. A standard search engine may return a link to one or more matching results, as well as a small snippet of text taken from within that result, in order to assist the user in evaluating the potential relevance of each result. Other variations of the search engine may permit the user to specify the format of the search results, e.g., video files, images, etc.

While useful, most existing solutions do not allow for the quick determination or verification within the search results themselves of whether audio/video results are relevant to an inquiry. Existing solutions also require significant context switching (a search result leads to media or to a document, with only a small search snippet as a guide)—they don't allow for the browsing of the underlying document (whether transcript or PDF or other document) within the search result itself.

There is therefore a need for a system and related method that addresses one or more of the shortcomings described above.

BRIEF DESCRIPTION OF THE DRAWINGS

FIG. 1 is an exemplary screenshot of a user interface for implementing an interactive transcript searching method and system, depicting a search result that includes a transcript excerpt.

FIG. 3 is an exemplary screenshot of a user interface depicting grouping of search result snippets from a plurality of documents related to a common event.

FIG. 4 is an exemplary screenshot of the user interface of FIG. 4, depicting an indicator signifying audio playback of one of the document snippets beginning at a portion of the snippet selected by the user.

FIG. 7 is an exemplary drawing of a user interface depicting certain inline browsing options as applied to a search result snippet, after a user has elected to expand the inline view of the transcript or document within a search result.

DETAILED DESCRIPTION

Figure 2:
FIG. 2 is an exemplary screenshot of the user interface of FIG. 1, depicting an indicator signifying audio playback of the transcript excerpt beginning at a portion of the snippet selected by the user.

With reference to the accompanying figures, a system and method for interactive searching of audio/visual data files (based on, e.g., transcripts) and associated publications/data/text files is described herein. The system includes a user interface for accessing a search engine configured to provide results that better contextualize media and document content so that users can review the underlying media and documents without having to leave search results.

The elements described in greater detail below may allow for an inline browsing experience inside of search results, making it substantially easier to determine if the returned audio or visual content, e.g., a seminar or court hearing (which could be very long), is related or relevant to a user's inquiry (with less context switching), and at the same time making it easier for users to get the information they need without having to leave the search results page.

Audio/visual files may include, but are not limited to, recordings of speeches, roundtables, panel discussions, lectures, seminars, books on tape and audiobooks, recordings of conference calls, podcasts, court hearings, interviews, depositions, readings/performances of print and online articles, etc. When video exists, the system may be configured to allow a user to let a user choose between results that combine audio and video or just an audio feed by itself within the search results. Going audio-only may be faster for the user since less data needs to be transmitted to the user's computer, such that results may be more instantaneous and/or less subject to buffering. Audio results also may be all that a user needs under the circumstances to determine relevance of the content, and it may be less distracting than also trying to watch video at the same time.

Media files may not require preprocessing, although such preprocessing can improve the efficiency of the implementation (e.g. creating audio-only versions of video files). Standard media delivery options can be used. Specifically, search results, transcript segments, document segments, transcripts, documents, and multimedia files can be sent to a user's computer using standard methods for internet websites, which may include: streaming, direct downloads, http and other internet protocols, and each of the foregoing whether providing the file in whole, in packets, or in a custom-method of dividing files, e.g., sending transcripts/documents by segment or page or other subdivision.

Text files may include transcripts, publications, pleadings, court opinions, or other written records associated with or cited by or related to the audio/visual files in some way. For example, text files may include written materials (in hard copy or electronic format, e.g., PDF or HTML) distributed in connection with a presentation that is memorialized in the audio/video file or excerpts from those written files. Additionally or alternatively, text files may include transcriptions of the audio within the audio or visual file. For convenience, all forms of textual content may be referred to herein as "transcripts," whether they are actually transcripts or one of the other sources of written content described herein.

Text may be imported directly in the case where the materials exist in a machine-readable format. Alternatively, text may be generated through manual input, optical character recognition ("OCR"), or any other technique, as would be appreciated by one of ordinary skill in the relevant art. Transcripts also may be generated in one or more different ways, including, e.g., manual transcription or the use of voice recognition software (such speech to text software, using and based on a variety of algorithms, is available from a variety of established and startup third party companies via APIs, access to which can be purchased—and there are open-source projects that provide speech to text recognition as well).

Figure 1:
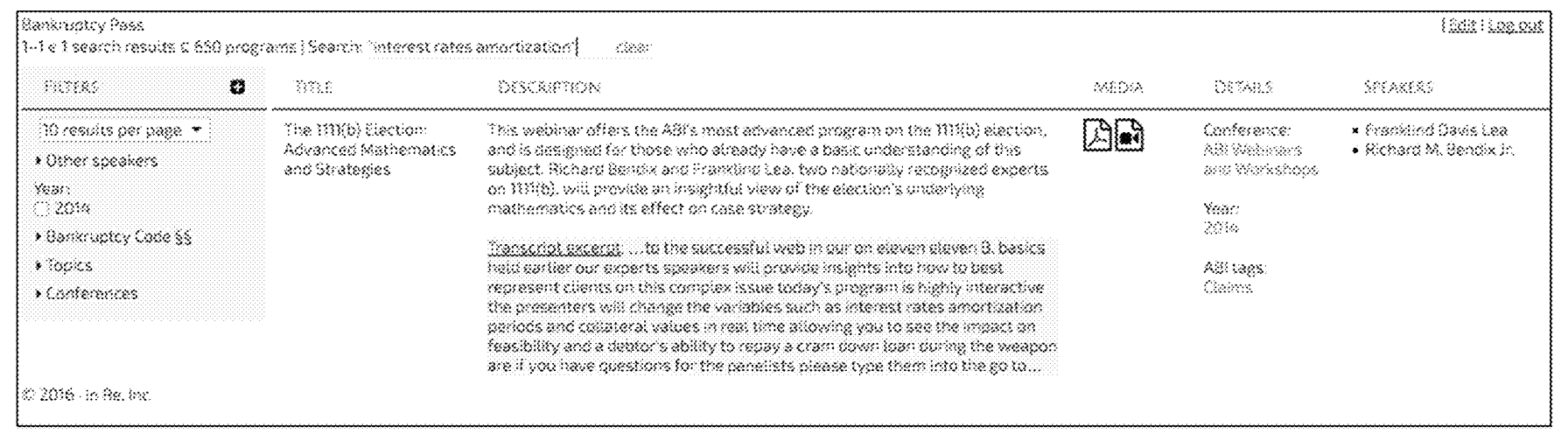

Turning now to FIGS. 1 and 2, for queries of audio and video content, search results may include matches within transcripts, where relevant sections of the transcripts are shown to the user. Search results may be interactive, in that any word can be clicked to start listening or watching to the corresponding audio or video file from that point. For video files, users can be given the choice to either watch or only listen to the video from that point by clicking on a word.

Audio and/or video transcript segments shown in search results can be expanded (e.g., from paragraph to full page), paginated (next or previous page, first or last page, etc.), or searched (a sub-search applied to a single seminar/hearing providing additional details within that specific result) without leaving search results or changing the other results.

Audio/video transcripts may be stored as text segments in a search index, with word location data (where that word appears in time in the audio or video file) stored adjacent to each word within the text segment, e.g., as a time stamp in an encoded format that is not indexed. In one aspect, the lack of indexing means that phrase searching on the text segment correctly ignores the encoded time stamps. In another aspect, even if the encoded time stamps are not indexed, since the full transcript time segments including the encoded time stamps are separately stored in toto for retrieval of search result snippets, the search result snippets may include the encoded time stamps, which are then decoded, e.g., by the client's browser or by the server prior to sending to the client's browser. In either case, the time stamps are excluded from the text displayed to the user, but are included with the served results in order to be used to start playback at the correct time when a user clicks on any word in the transcript.

Separately, transcript pages may be stored individually (outside of the search index) on a server (same or different) for direct access by a client browser, so that users can expand a transcript segment or paginate transcript pages without running new searches. For example, the client browser simply may retrieve the appropriate transcript page files directly when search results are transmitted back to the user or when the system receives a user selection of the result associated with those page files. Specifically, browsing a transcript may cause some strain on a server, e.g., if there is a continual request for new pages. Thus, in order to preserve speed and data efficiency, rather than sending an entire transcript every time a user wants to browse it inline (within the search results), the method may include the steps of preprocessing and storing every transcript/document page/slice into separate files and storing those files on a separate server or service, thereby distributing the computing load that the system experiences in the combined search and retrieval processes. Files may include a naming convention (e.g. page 5 of file FILE could be http://server/FILE-page-5.jpg) that will allow a user's browser to directly grab the exact page/slice file it needs.

Figure 7:
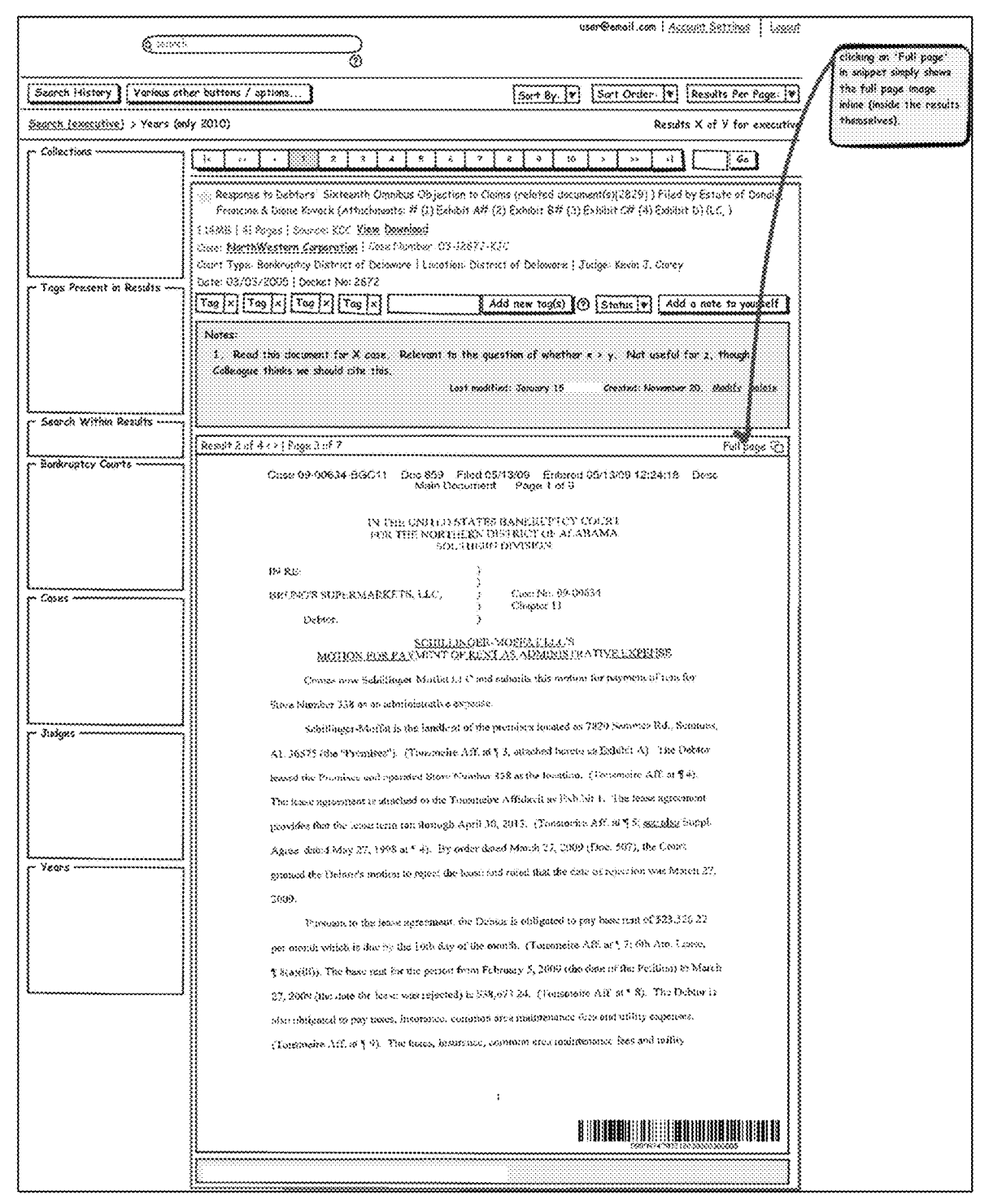

For PDFs or other included document types, each of the above methods applicable to documents can be replicated (expansion from a snippet to full page, pagination, and storage of individual pages outside of the search index). In addition, each snippet and page may be stored in its original format, e.g., as images, text, or PDFs—so that users can see the results in their original visual context. Further, as seen in FIG. 7, in the case of PDF, document, or image-based snippets within search results, those snippets can be clicked, revealing the resulting section or page of the underlying document/image (e.g., in one implementation, in a new browser window or tab).

Figure 3:
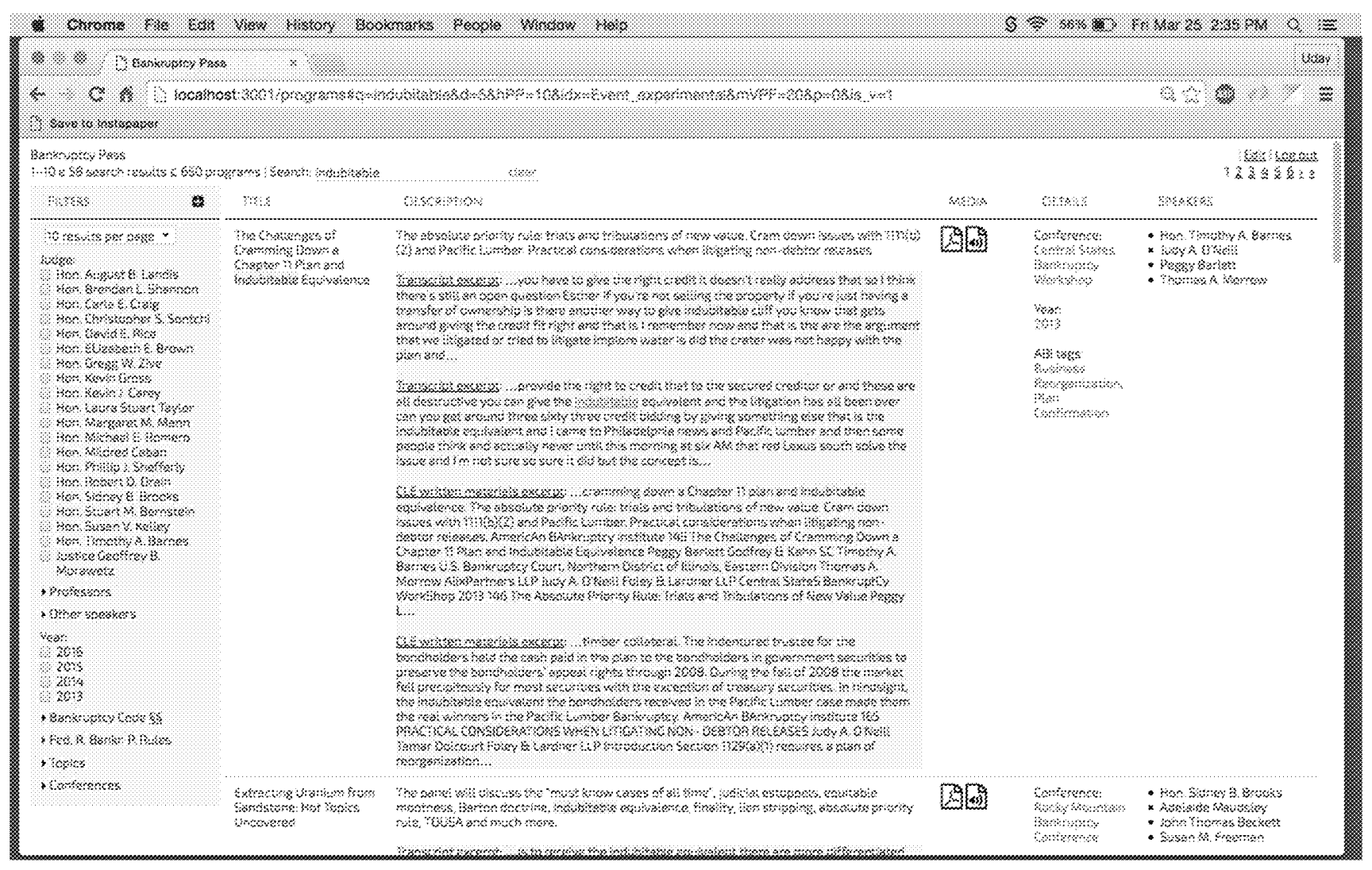
Figure 4:
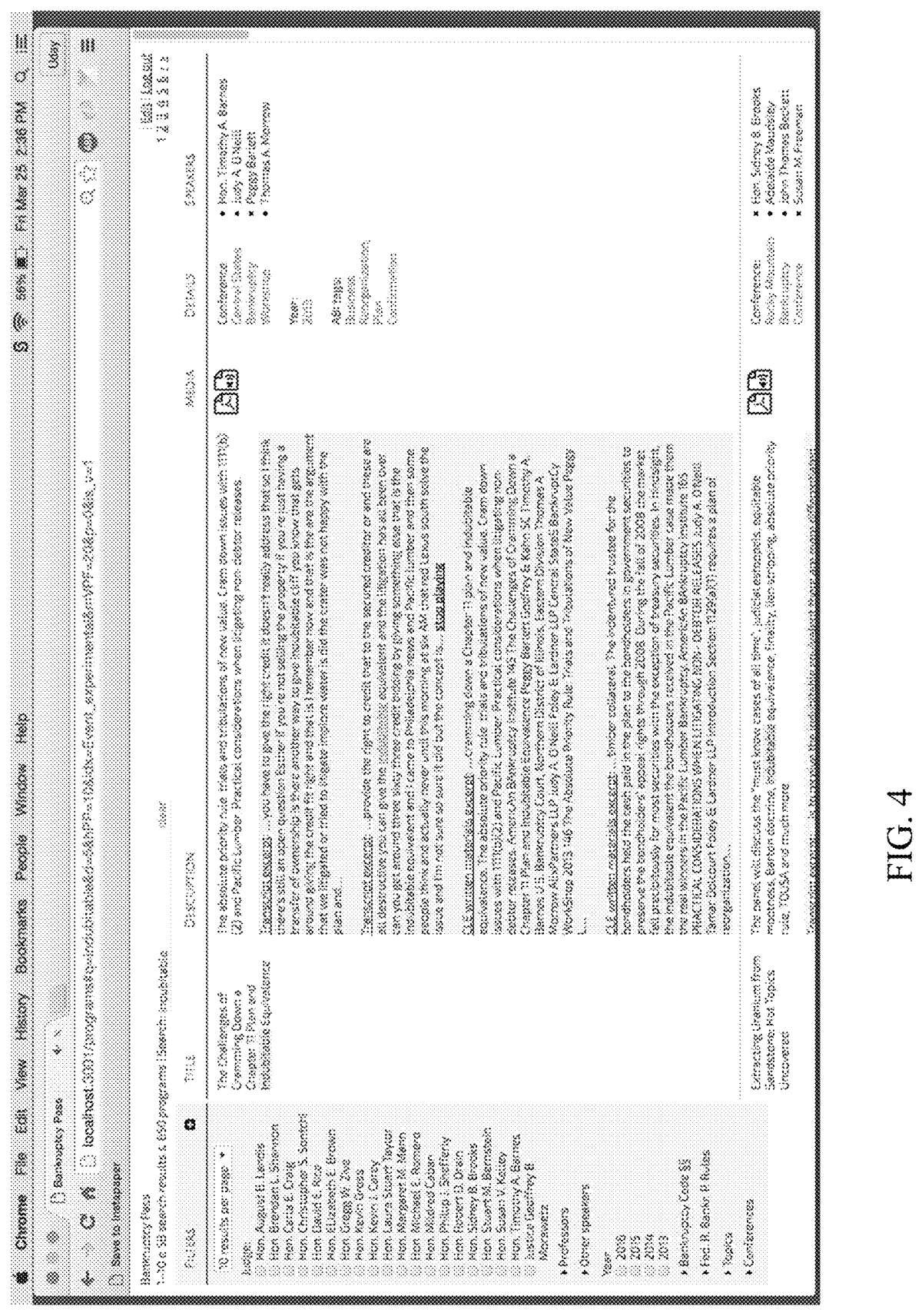
Figure 5:
FIG. 5 is an exemplary screenshot of the user interface of FIG. 4, also depicting the rendered HTML for transcript snippets.

As seen in FIGS. 3-5, related mixed results (audio, video, transcripts) may be presented in a single, grouped search result for users. For example, a seminar that has a video file and PDF (e.g., a digital copy of a handout) associated with it may produce different search results from the video's transcript and PDF. In another example, content may be related to the same event (e.g., the same seminar or court hearing), but may represent information conveyed at different times within that event, e.g., handouts may relate to a first speaker's presentation, while a transcript may be generated of a second speaker's presentation as part of the same seminar (or, e.g., in the case of a court hearing, pleadings filed before and court opinions and orders entered at or after the hearing). In still another example, content may be even more generally related, such as a transcript of a court proceeding and a news article discussing the proceeding. In each case, results may be placed together, whether ranked/sorted or not, so that a user can understand the full context of the relationship and/or relevance to the search. Results further may be sub-grouped, e.g., chronologically or categorically, within each group, to provide additional context to the user.

In one aspect, the search engine may be customized to store and retrieve the location details for transcript snippets. Preferably, however, the transcript content and related timestamps may be stored in the same record by search software, as discussed in greater detail below. As such, the search engine that receives a user input and matches it against the data store of transcripts, audio files, or video files may be one of any commercially available search engines and may not require additional customization to carry out the searches necessary with regard to the present system and method. As such, the system may be search-software-agnostic, providing significantly greater flexibility in implementing the system. For example, one search service that may be integrated into the system is a cloud-based search provider referred to under the trademark ALGOLIA.

For each transcript or other text file, the substantive content and a timestamp indicating the position of that content within an audio or visual file may be stored as a flat text file. In that case, each text file may be populated with each word followed by an encoded number. So for a transcript in which the content is "A B C," the stored text file may be "A code_a B code_b C code_c." The codes represent whatever the number should be, such as the time for a transcript or the location for a document/PDF. The search software, during indexing, treats the entire encoded file as a normal text file. The codes could be the numbers themselves, but the intent of the encoding is to have the search software ignore the codes when indexing the text, e.g., by designating characters/words as not indexed. In one example, each timestamp value may be converted to a character, such as certain punctuation marks, which are then ignored during search indexing.

In addition to creating a search index, search software generally allows fields to be stored for later retrieval, e.g., the text of a document for retrieval as snippets. Here, because the time/location details are combined with the transcript/document text, it is not necessary to store the time/location details in a separate for-retrieval field (the retrieval of which, to match the separate text, may not be trivial).

The flat file method for storing transcript details and location data within a search index, and the method for processing location data client-side by a user's browser may be explained in greater detail, as follows. Implementing the system may include configuring the search software to provide for multiple symbols that are not indexed and configuring the time stamps to include those non-indexed symbols. Once these parameters are set, the system then is provided with text to index. The software then, upon providing it a search query, can retrieve hits from the resulting search index. Separately, search software generally permits storage of unindexed text for retrieval as part of a search query to provide result snippets (i.e., short sections of the original content to provide end users with the context for a particular search result).

Thus, the system may: (a) use only standard indexing & snippeting features of search software for search speed and the other reasons mentioned above, (b) allow for search result snippets to include location information/time stamps for each word, i.e., where each word occurs inside a multimedia file, and (c) do so in a way where those time stamps are not indexed (thereby preserving the accuracy of phrase searches).

Explained in greater detail, the method—including its preprocessing—may include the steps recited in the following paragraphs.

First, annotating each word in a plain text transcript, itself already existing in a machine-readable format, created using OCR, or created using a commercial search to text API, of a multimedia file with a time stamp indicating where the word is present in the multimedia file (e.g., "good evening" becomes "good 100.5 evening 101.0", where the #'s represent the # of seconds from the beginning of the multimedia file at which those particular words appear in the file).

Second, converting each time stamp in the plain text file to an encoded time stamp using characters that are not indexed by the search software. For example, if the characters '!', ')', '%', and '.' are not indexed, and they represent 1, 0, 5, and '.' respectively in the code, then the text would become "good !)).% evening !)!.)".

Third, indexing this text file with encoded timestamps next to each word—since the search software ignores the characters used for the codes, only the words are indexed. So a phrase search for "good evening" would correctly return the foregoing example.

Fourth, storing the text file with encoded timestamps, in toto, in the search software for purposes of providing search result snippets.

Fifth, storing media file location(s) (e.g. URLs) in the search software for purposes of retrieval at search time and display with the search result snippets.

Sixth, receiving, by the search software, a query (e.g. "good evening")—and, in return, providing search results (only looking for, in the example, "good evening"), search snippets (which would include the unindexed timestamps), and the media file location(s).

Seventh, unencoding, e.g., by the user's browser via JavaScript code provided by the system to the user, the time stamps within the search result snippets received and storing the unencoded location information with each word—either as a link or as a data attribute for a span or other HTML element associated with each word in the snippet. When the user clicks on that link or other HTML element associated with a word of a search result snippet, the JavaScript code causes the browser to retrieve the correct media file (in whatever way is most efficient, whether streaming or otherwise) and play that media file starting from the time associated with that word.

Thus, the method may allow for fast and efficient search, retrieval, and analysis. In particular, the system may be considered efficient, because it may rely on existing search software, and because it may allow the user's browser with minimal effort to retrieve the correct location of the correct multimedia files.

Alternative solutions to the problem of determining the location of search results within audio/video content exist, but they require either using custom/customized search software or associating additional data mapped to each indexed word in separate data structures—both of which may (a) encompass significant search-software-specific customizations, (b) require vendor lock-in, (c) not enjoy the efficiency of standard search engine methods, and (d) not benefit from industry-wide improvements in search software speed (which may not make it to any one specific search software product or may not be applicable given the required search-software-specific customizations). These solutions may be difficult to implement—less scalable—and less practical.

Once a library of one or more transcripts has been created, the method further may include searching and retrieval of one or more specific portions of at least one transcript that correspond sufficiently to a user's search query. For example, the method may include receiving a search request, analyzing a search index for one or more matches, transmitting data corresponding to both the indexed content and matching non-indexed content (including timestamps) of one or more matches to the user's computer system with instructions to display one or more relevant portions of one or more transcripts sufficiently matching the request, receiving a user input corresponding to a word within one of the search results, and launching an audio or video player to immediately play a corresponding audio/video file beginning at the selected word by relying on the timestamp corresponding to the selected word. As discussed above, the displaying step may include grouping related results together, e.g., results from within the same transcript, by the same author/speaker, at the same event, etc. The user interface also may be configured for in-line browsing of the transcript, such that text results returned to the user are not static but instead may be displayed dynamically to permit the user to move through them to analyze other parts of the transcript while still within the search results portion of the UI.

Figure 6:
FIG. 6 is an exemplary drawing of a user interface depicting certain inline browsing options as applied to a search result snippet.

Navigation still within the search engine UI may permit the transcript to be browsed. Thus, as discussed above, search results need not be static—users can browse a clickable transcript or clickable PDF or other document by expanding a snippet to the full encompassing page (still within and underneath that search result), paginate, go to the previous or next page, go to a totally different page, search within that document, and interact in other ways (table of contents, annotate the document, etc.) still within the search result and not requiring context switching. FIG. 6 depicts one example of a UI for applying inline browsing options to a search result snippet. Additionally, FIG. 7 depicts an example of a UI with inline browsing options applied to a search result snippet, after a user has expanded the inline view of the transcript or other document within a search result.

With regard to inline browsing of search results, the system may include additional features or data to help the user such as listings with links to key sections/moments in an event (e.g., a change in speaker or topic) or a table of contents, annotations, etc.

In one exemplary aspect, the system may include:
media files and documents in a local or remote data repository, such as Amazon S3. The data repository may include computers/servers and networking equipment with processors that carry out storage and networking tasks;
a second server or set of servers, which may include networking equipment with processors that carry out web server, server administration, and networking tasks;
a search engine configured to generate and carry out queries on a search index, including related tasks. The search engine may be executed by computers/servers and networking equipment with processors that carry out search engine, search software, search server, administration and networking tasks;
a speech to text API from one of the many speech-to-text software vendors in the market, which may be stored on one or more computers/servers and networking equipment with processors that carry out search to text tasks, and administration and networking tasks;
web server instructions, e.g., written in Ruby using the framework Ruby on Rails, with a suitable web server (Puma or any other server) running Ruby on Rails on Heroku and a suitable database program (postgresql or any other database software) running on Heroku; and
html, css, and JavaScript code provided to end users' web browsers (running on end users' computers and processors and relying on attached displays and sound output devices).

An end user communicates to the server hosted at Heroku by using the service's internet address. The address' DNS information may be hosted by GoDaddy or another DNS manager. After DNS resolution, the server at Heroku provides the end user's browser with an html page, css code, JavaScript code, and associated data files (e.g. images). The end user can then log in or sign up for the service (their information stored in the database hosted by Heroku). Once logged in, the server at Heroku provides the user a search page (html, css, JavaScript and associated data files). The logic of how to conduct a search is included in the JavaScript file. If the user enters a search in an html form, the JavaScript sends the search to Algolia, which then returns results in JSON format. The JavaScript formats that JSON data and presents the users with search results. If the user interacts with the search results (e.g. clicking on a word in a transcript), the JavaScript instructs the browser to take the correct action (e.g. retrieve the media file and begin playback at the correct point). For certain requests, the JavaScript instructs the browser to communicate directly with Amazon S3 to retrieve files.

It will be understood that the hardware, software, and programming language choices recited herein are intended to be exemplary and should not be considered as limiting the scope of the system. Other options are available, as would be appreciated by one of ordinary skill in the relevant art.

Any of the embodiments described herein may be modified to include any of the structures or methodologies disclosed in connection with different embodiments. Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the disclosure are reserved.

I claim:

1. A computer-implemented method executed by a hardware processor for using a search software product to provide interactive search results for queries of digital multimedia files, comprising:
    converting a digital multimedia file to plain text data format to generate a transcript;
    generating a first text file that includes a plurality of words that are retrieved from the transcript;
    adding per-word text data that is associated with the digital multimedia file to the first text file following each of the plurality of words within the text file;
    converting the per-word data within the first text file to text characters that are not indexed by the search software product, which is stored as a second text file; and
    indexing the second text file within the search software product,
    wherein the search software product is configured to generate interactive search results for the transcript based on a first search that is conducted using the search software product, which is executed via a processor, according to the following steps:
        receiving a first query from a graphical user interface in connection with a first text string identified by the user within the second text file;
        sending the first query to the search engine product;
        identifying the first text string within the second text file;
        retrieving first per-word text data that is associated with the first text string;
        identifying information within the digital multimedia file corresponding with the first per-word text data; and
        displaying the interactive search results to the user, which includes the identified information within the digital multimedia file,
    wherein the interactive search results are configured to generate a HTML element associated with the first text string to play the portion of the digital multimedia file associated with the first text string.

2. The method of claim 1, wherein the per-word data includes page numbers, slide numbers, page location details, or speaker labels.

3. The method of claim 1, wherein the per-word data entries include time stamps.

4. The method of claim 1, wherein the digital multimedia file includes spoken words.

5. The method of claim 1, wherein the transcript includes a table of contents.

6. The method of claim 1, wherein the digital multimedia file is a video file or an audio file.

7. The method of claim 1, wherein the digital multimedia file is a PDF document or slides from a presentation.

8. The method of claim 1, wherein the interactive search results are configured to generate inline browsing of the digital multimedia file.

9. A system having a hardware processor and a memory that executes a search software product to provide interactive search results for queries of digital multimedia files, comprising:
- converting a digital multimedia file that includes spoken words to plain text data format to generate a transcript;
- generating a first text file that includes a plurality of words that are retrieved from the transcript;
- adding per-word text data that is associated with the digital multimedia file to the first text file before or following each of the plurality of words within the text file;
- converting the per-word data within the first text file to text characters that are not indexed by the search software product, which is stored as a second text file; and
- indexing the second text file within the search software product,
- wherein the search software product is configured to generate interactive search results for the transcript based on a first search that is conducted using the search software product, which is executed via a processor, according to the following steps:
  - receiving a first query from a user interface in connection with a first text string identified by the user within the second text file;
  - sending the first query to the search engine product;
  - identifying the first text string within the second text file;
  - retrieving first per-word text data that is associated with the first text string;
  - identifying information within the digital multimedia file corresponding with the first per-word text data; and
  - displaying the interactive search results to the user, which includes the identified information within the digital multimedia file,
- wherein the interactive search results are configured to generate a HTML element associated with the first text string to play the portion of the digital multimedia file associated with the first text string.

10. The system of claim 9, wherein the per-word data includes time stamps, page numbers, slide numbers, or speaker labels.

11. The system of claim 9, wherein the digital multimedia file is a video file.

12. The system of claim 9, wherein the digital multimedia file is an audio file.

13. The system of claim 9, wherein the user interface is configured to generate inline browsing of the digital multimedia file.

14. The system of claim 9, wherein enabling the interactive search results further includes the step of:
- indicating more than one instance of the first text string within the second text file,
- wherein each instance of the first text string is displayed on the user interface.

* * * * *